US006577801B2

(12) United States Patent
Broderick et al.

(10) Patent No.: US 6,577,801 B2
(45) Date of Patent: Jun. 10, 2003

(54) HOLEY OPTICAL FIBERS

(75) Inventors: Neil Gregory Raphael Broderick, Swaythling (GB); Peter Jonathan Bennett, Chelmsford (GB); Tanya Mary Monro, Bassett (GB); David John Richardson, Bitterne Park (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 10/003,726

(22) Filed: Nov. 2, 2001

(65) Prior Publication Data

US 2002/0118937 A1 Aug. 29, 2002

Related U.S. Application Data

(63) Continuation of application No. PCT/GB00/01934, filed on May 19, 2000.

(30) Foreign Application Priority Data

Jul. 14, 1999 (GB) .............................................. 9911698
May 19, 2000 (WO) ........................................... 00-72067

(51) Int. Cl.⁷ ................................................. G02B 6/04
(52) U.S. Cl. ........................ 385/125; 385/115; 385/116
(58) Field of Search ................................ 385/125, 115, 385/116, 120

(56) References Cited

U.S. PATENT DOCUMENTS

| 5,155,792 A | 10/1992 | Vali et al. |
| 5,802,236 A | 9/1998 | DiGiovanni et al. |
| 6,334,019 B1 * | 12/2001 | Birks et al. .................. 385/125 |
| 6,404,966 B1 * | 6/2002 | Kawanishi et al. ......... 385/123 |

FOREIGN PATENT DOCUMENTS

| EP | 0 779 523 A2 | 6/1997 |
| WO | 98/44367 | 10/1998 |
| WO | 99/64903 | 12/1999 |
| WO | 00/06506 | 2/2000 |
| WO | 00/16141 | 3/2000 |

OTHER PUBLICATIONS

Koops Hans W.P.: "Photonic Crystals Built by Three-Dimensional Additive Lithography Enable Integrated Optics of High Density". Proceedings of the Spie, US, Spie, Bellingham, VA, Aug. 5, 1996.

(List continued on next page.)

Primary Examiner—Hung N. Ngo
(74) Attorney, Agent, or Firm—Renner, Otto, Boisselle & Sklar, LLP

(57) ABSTRACT

The percentage fraction of fundamental mode power located in the cladding holes of different holey fibers ($PF_{holes}$) is shown as a function of wavelength in microns of the fundamental mode ($\lambda$). Properties of two groups of holey fibers are shown. The upper group of three curves shows embodiments of the invention with $\Lambda=0.75$ μm and $d/\Lambda=0.6$, 0.7 & 0.8 respectively, where d is the hole diameter and $\Lambda$ the hole spacing or pitch. The lower group of curves, which are almost superimposed on each other, show properties of holey fibers representative of the prior art with $\Lambda=3.2$ μm and $d/\Lambda=0.6$, 0.7 & 0.8 respectively. A huge improvement in the mode power present in the holes is evident. In the prior art curves, the mode power fraction is generally less than 1%, whereas with the illustrated embodiments of the invention, holey fibers with 10–40% of the fundamental mode power in the holes are achieved. Generally the holey fiber should be structured such that the wavelength of the guided light $\lambda>2.2\Lambda$. For telecommunications wavelengths, this means that the hole spacing should be smaller than typical in the prior art, i.e. around 1 μm or less, and the hole diameter should be as large as possible in relation to the hole spacing, preferably $d/\Lambda>=0.6$.

16 Claims, 1 Drawing Sheet

OTHER PUBLICATIONS

Birks, T.A. et al. "Full 2–D photonic bandgaps in silica/air structures." *Electronics Letters.* Oct. 26, 1995, vol.31 No. 2, pp. 1941–1943.

Bennett, P.J. et al. "Toward practical holey fiber technology: fabrication, splicing, modeling, and characterization." *Optics Letters.* Sep. 1, 1999, vol. 24 No. 1, pp. 1203–1205.

Bennett, P.J. et al. "A robust, large air fill fraction holey fiber." *CLEO '99,* CWF64. p. 293.

Rosenberg, A. et al. "Near–infrared two–dimensional photonic band–gap materials." *Optics Letters.* Jun. 1, 1996, vol. 21 No. 11, pp. 830–832.

Kaiser, P. et al. "Low–Loss Single–Material Fibers Made From Pure Fused Silica." *The Bell System Technical Journal.* Jul.–Aug. 1974, vol. 53 No. 6, pp. 1021–1039.

Birks, T.A. et al. "Single material fibres for dispersion compensation." *OFC '99,* paper FG2. Pages 108–110.

Monro, Tanya M. et al. "Holey Optical Fibers: An Efficient Modal Model." *Journal of Lightwave Technology.* Jun.1999, vol. 17 No. 6, pp. 1093–1102.

Monro, Tanya M. et al. "Modeling Large Air Fraction Holey Optical Fibers." *Journal of Lightwave Technology.* Jan. 2000, vol. 18 No. 1, pp. 50–56.

Ikuta, K. et al. "Remote sensing of methane differential absorption lidar at 1.67 $\mu$m." *CLEO '98,* CThQ4.

Cregan, R.F. et al. "Single–Mode Phonetic Band Gap Guidance of Light in Air." *Science.* Sep. 3, 1999, vol. 285, pp. 1537–1539.

* cited by examiner

HOLEY OPTICAL FIBERS

This application is a continuation of International Patent Application No. PCT/GB00/01934 filed on May 19, 2000, which is hereby incorporated herein by reference in its entirety.

BACKGROUND OF THE INVENTION

The invention relates to holey fibres and other analogous cavity waveguiding structures.

A holey fibre is an optical fibre whose optical confinement mechanism and properties are affected by an array of air holes defined by cavities that run lengthwise down the fibre. Light can be guided within holey fibres by two distinct mechanisms. First, with periodic arrangements of air holes, guidance can be obtained through photonic band gap effects [1]. Second, guidance can be obtained from volume average refractive index effects. This second guidance mechanism does not rely on periodicity of the air holes [2].

Generally, a holey fibre has a solid core surrounded by a holey cladding region. The structure is fabricated by stacking silica capillaries in a hexagonal close packed array and then removing one of the capillaries and replacing it with a solid silica rod of the same outer dimensions. The fibre stack is then drawn to bundle form in a one or two stage process. Fabrication of holey fibres is discussed further in the literature [3][4]. In the literature, the core is sometimes referred to as the central index defect, or defect for short, and the surrounding holey cladding as the hole lattice.

Holey fibres are generally characterised in terms of hole size and hole spacing. Because of the fabrication method, the holes are usually periodically spaced, the period usually being termed as "pitch", $\Lambda$, in the literature. Because of the fabrication method, the holes are also usually circular and thus categorised by a diameter, d. Typical dimensions of existing holey fibres are at least 2 microns for the pitch, although some smaller pitches are mentioned in the literature. Specifically, reference [2] discloses a pitch $\Lambda=0.925$ $\mu$m with hole diameters of d=0.688 or 0.833 $\mu$m. Moreover, reference [7] discusses a silica core of diameter d=0.962 $\mu$m suspended in air in the context of a theoretical study related to using holey fibre to compensate for group velocity dispersion in standard telecommunications fibre.

Further general background relating to theories applicable to holey fibres may be found in the literature [5][6].

One application suggested for holey fibres is sensing. It is proposed that a fluid, i.e. gas or liquid, is present in the fibre cavities. A property of the fluid is then sensed by its effect on that part of the optical mode, generally an evanescent wave part, which propagates in the holey cladding region.

Another application suggested for holey fibres is for low-loss telecommunication fibre. In principal, it might be expected that propagation losses could be reduced in a holey fibre, by virtue of the lower losses associated with the holes relative to the glass regions of the fibre. More fundamentally, a holey fibre with a photonic band gap could reduce losses through photonic crystal effects.

These applications pre-suppose that a significant proportion of mode power is present in the holey cladding region of the fibre. Holey fibres of the type based on photonic band gap guidance mechanism have very recently been fabricated with a large percentage of mode power in the "active" holes of the cladding region [14]. However, this type of holey fibre requires periodicity in the hole structure and thus can be expected to be quite difficult to fabricate commercially.

Consequently, holey fibres of the type based on the average refractive index guiding mechanism are in principal more attractive since there is no equivalent requirement of hole periodicity. However, examples of this latter type of holey fibre fabricated to date have only a very small percentage of mode power in the "active" holes of the cladding region. This fact, not hitherto appreciated, has been determined by a theoretical model developed by the inventors, as described in references [8] and [9]. The full contents of references [8] and [9] are incorporated herein by reference.

Reference [8] describes a scalar orthogonal function method for holey fibres, which is valid when the holes are small.

Reference [9] extends the model to the vector case, which enables the full range of holey fibres to be modelled. This technique involves decomposing the modal field using localised functions. The central index defect and the hole lattice are described independently using localised functions for the defect and periodic functions for the holes. This can be efficient and accurate because the quantities are described by functions chosen carefully to suit.

The model of references [8] and [9] allows computation of the proportion of mode power present in the holes of the cladding region of a holey fibre. Using this model, it has been determined that previously fabricated holey fibres guiding by average refractive index effects typically have only around 1% or less of their mode power in the holes.

Clearly, this is not good for any of the proposed holey fibre devices whose efficiency depends on mode power in the holes.

It is therefore an aim of the invention to provide a holey fibre based on average refractive index guidance effects which has a relatively high proportion of mode power in the holes, i.e. a relatively large evanescent overlap of the mode field with the fibre cavities.

SUMMARY OF THE INVENTION

According to a first aspect of the invention there is provided a holey fibre having holes with a pitch of less than 0.9 microns, more preferably approximately 0.75 microns, positioned adjacent to the core. The pitch is preferably between 0.1 and 0.9 microns, more preferably between 0.5 and 0.9 microns. The ratio of hole size to pitch is preferably greater than or equal to approximately 0.6.

According to a second aspect of the invention there is provided a method of guiding light along an optical fibre by average refractive index effects, the optical fibre having a core and a cladding, the cladding containing holes distributed across the optical fibre to define a pitch, wherein the wavelength of the light is at least approximately 2.2 times the pitch of the holes. The holes preferably have a pitch of less than 0.9 microns, more preferably approximately 0.75 microns. The ratio of hole size to pitch is preferably greater than or equal to approximately 0.6. In an embodiment of the invention, the holes are approximately circular and the ratio of hole diameter to pitch is between 0.6 and 0.8.

With these aspects of the invention it is possible to achieve a massive improvement in the mode power present in the holes without photonic band gap effects. The percentage fraction of fundamental mode power located in the holes is used as a figure of merit. In the prior art holey fibres using average refractive index guidance effects, this is generally less than 1%, often much less. With the invention, it is possible to realise holey fibres based on average refractive index guidance effects that have 10–40% or more of the fundamental mode power in the holes. In some embodiments, the holey fibre may have a highly periodic hole structure and thus may possess significant photonic band gap effects.

The design rules specified above thus allow for large evanescent overlap of the mode field with the air, other fluid or vacuum present in the fibre holes. The holes should be arranged adjacent to the core so that they interact significantly with the optical mode guided by the core. In addition to the small pitch holes arranged around the core, there may be a farther group of holes radially outward of the small pitch holes, for example larger holes for ease of fabrication. On the other hand, the small pitch holes may extend across all the cladding region and constitute the only group of holes in the cladding region.

The proposed holey fibres generally incorporate relatively large amounts of air within the structure, typically with a space (air) fill factor in the cladding of greater than 40%. Moreover, the hole spacing, i.e. pitch, should preferably be shorter or comparable to the optical wavelength of the mode of interest.

The invention will be of potential interest to all applications requiring an optical interaction with a liquid, gaseous or vacuum field by evanescent field effects. For example, the concentration of pollutants in a gas could be determined by measuring the absorption which occurs as light propagates through the gas for a range of wavelengths [10]. Particular applications of interest are:

1) transport of high power optical beams (low optical non-linearity fibre);
2) low-loss optical fibre for transmission systems;
3) optical sensors (gas detection, liquid composition, medical);
4) atom optics;
5) optical manipulation of microscopic particles;
6) particle separation (by mass, induced polarisability, electric dipole moment);
7) Raman lasers;
8) non-linear optical devices;
9) referencing of a laser to specific gas absorption lines;
10) metrology; and
11) dispersion compensation in transmission systems (holey fibre embodying the invention can be made to exhibit high dispersion).

BRIEF DESCRIPTION OF THE DRAWINGS

For a better understanding of the invention and to show how the same may be carried into effect reference is now made by way of example to the accompanying drawings in which.

DETAILED DESCRIPTION

To assess the suitability of holey fibres for evanescent field devices, it is crucial to know the magnitude of the overlap of the modal field with the holes. This has not hitherto been addressed. The present invention and its embodiments are based on what is believed to be the first studies of the magnitude of the overlap of the modal field with the holes in holey fibres.

The parameter $PF_{holes}$ is defined as the fraction of power of the fundamental mode guided by the holey-fibre waveguiding structure which is located in the holes.

To evaluate $PF_{holes}$ the mode profile for a given wavelength is first calculated using the vector model described in reference [9]. It is then straightforward to evaluate $PF_{holes}$ at that wavelength numerically. The value of the parameter $PF_{holes}$ has been calculated for a range of different holey fibres and wavelengths. The experimental and theoretical results are now discussed with reference to FIG. 1 and FIG. 2.

Figure 1:
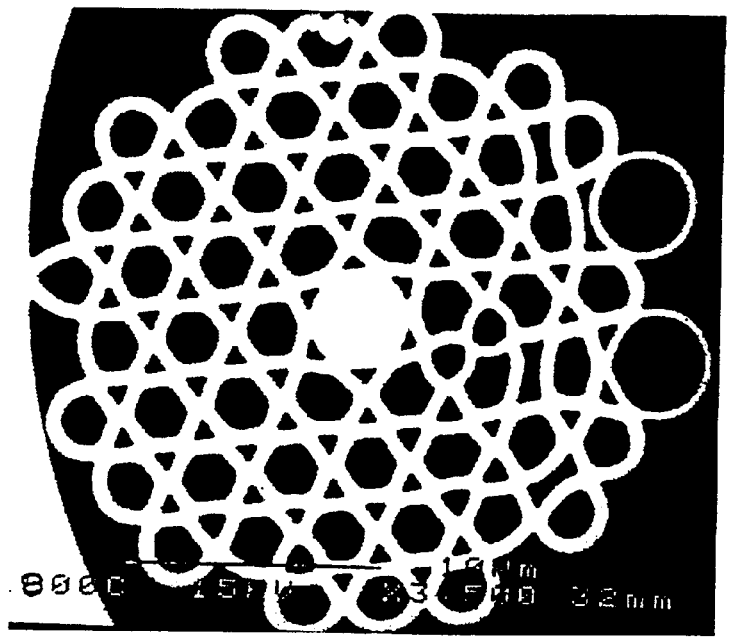
FIG. 1 is scanning electron micrograph (SEM) representative of a typical prior art holey fibre with approximate dimensions: hole diameter, d=1.9 microns; and hole spacing, $\Lambda$=3.2 microns (d/$\Lambda$=0.6)

FIG. 1 is scanning electron micrograph (SEM) representative of a typical prior art holey fibre with approximate dimensions of hole diameter, d=1.9 $\mu$m and hole pitch, $\Lambda$=3.2 $\mu$m (d/$\Lambda$=0.6). Holey fibres embodying the invention may have the same general structural features, but have different absolute and/or relative dimensioning as described in the following. In alternative embodiments, the solid core of the holey fibre of FIG. 1 may be replaced with a further holey fibre array characterised by smaller feature sizes than the cladding. For example, with a smaller characteristic hole pitch and hole diameter than for the cladding. This general structure is described in reference [13], the contents of which are incorporated herein by reference, specifically in the embodiment of FIG. 4 of that document.

Figure 2:
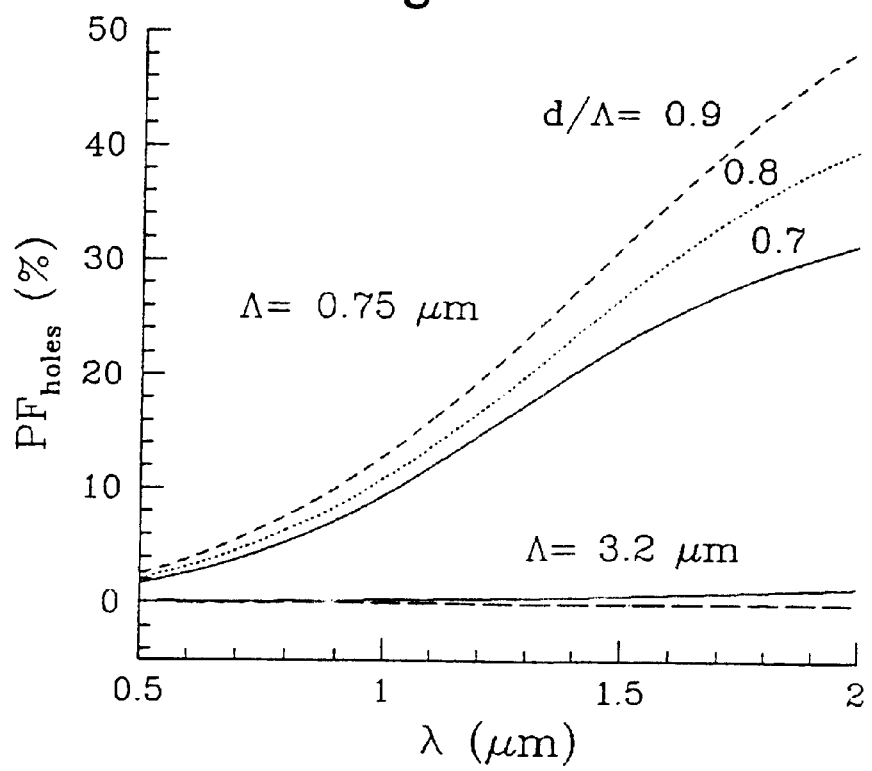
FIG. 2 is a graph showing the percentage fraction of fundamental mode power located in the holes of different holey fibres ($PF_{holes}$) as a function of wavelength in microns of the fundamental mode ($\lambda$).

FIG. 2 is a graph showing the percentage fraction of fundamental mode power located in the holes of different holey fibres ($PF_{holes}$) as a function of wavelength in microns of the fundamental mode ($\lambda$).

Properties of two groups of holey fibres are shown. The upper group of three curves shows embodiments of the invention with $\Lambda$=0.75 $\mu$m and d/$\Lambda$=0.6, 0.7 & 0.8 respectively. The lower group of three curves, which are almost superimposed on each other, show properties of holey fibres representative of the prior art with $\Lambda$=3.2 $\mu$m and d/$\Lambda$=0.6, 0.7 & 0.8 respectively.

For the fibre of FIG. 1, which is representative of the prior art holey fibres, $PF_{holes}$ is surprisingly just 0.6% at $\lambda$=1.5 $\mu$m. More generally, the holey fibres of the prior art typically have a pitch (i.e. hole spacing) in the range $\Lambda$=2–3.5 $\mu$m. With our theory, it is found that $PF_{holes}$ is insignificant for such holey fibres over the wavelength range $\lambda$=0.5–2 $\mu$m. For example, the lower set of curves in FIG. 2 corresponds to holey fibres with $\Lambda$=3.2 $\mu$m and relative hole diameters d/$\Lambda$=0.6, 0.7 and 0.8 respectively.

From the inventors' model of reference [9], it is immediately striking that the field distribution depends strongly on the feature size in the holey fibre relative to wavelength of the guided light. Accordingly, $PF_{holes}$ can be tailored by a suitable choice of holey fibre feature sizes. This does not appear to have been appreciated in the prior art.

To understand how feature size should be chosen, we consider a solid silica rod of diameter 1.25$\Lambda$ suspended in air, $\Lambda$ being the pitch of an equivalent holey fibre. Although this suspended structure is clearly impractical, it should be a good approximation for large air-fill holey fibres. A value of 1.25$\Lambda$ is chosen because it gives good agreement in the step-index fibre analogy [7]. The modes of this simple structure can be found exactly [11]. It is found that a significant fraction of the fundamental mode is outside the core when V<2, V being the fibre parameter. This leads to the requirement that $\lambda$ should be greater than approximately 2.2$\Lambda$ in order for $PF_{holes}$ to be significant. At telecommunications wavelengths, i.e. 1.3 and 1.5 µm, this condition is only satisfied for relatively small pitches Λ which leads to very small mode areas of less than approximately 1 µm². Consequently, such fibres should also have potential applications in non-linear experiments.

The upper curves in FIG. 2 show $PF_{holes}$ for a range of holey fibres with Λ=0.75 µm. The above condition of Λ is greater than or equal to approximately 2.2Λ has been used to guide the selection of the pitch Λ. (For the 1.3 µm telecommunication window, this condition is satisfied by a pitch of approximately 0.6 µm or less. For the 1.5 µm telecommunications window, the condition is satisfied for a pitch of less than approximately 0.7 µm).

From FIG. 2, it is clear that $PF_{holes}$ is dramatically increased by using the smaller pitch of 0.75 µm. For example, $PF_{holes}$ is approximately 30% at 1.5 µm for a holey fibre with hole separations d/Λ=0.8. So far, we have fabricated holey fibres with d/Λ as large as 0.7 [7]. We thus expect it should be practical to fabricate such fibres. It should not be more difficult to obtain small pitches. The high degree of overlap between the fundamental mode and the holes evident in FIG. 2 implies that holey fibres can be fabricated which are useful as evanescent field devices, which cannot be said for typical prior art holey fibre structures as exemplified by the lower curves of FIG. 2.

To demonstrate the possibilities for using holey fibres in evanescent field devices, the holey fibre discussed above with Λ=0.75 µm and d/Λ=0.8 is now considered. Using 1.67 µm light, it is possible to measure methane concentrations [12]. For this fibre, FIG. 2 predicts that $PF_{holes}$=35% at this wavelength. Hence, less than 3 meters of this holey fibre is required to obtain an equivalent free-space path length of 1 meter. Hence by coiling the fibre, extremely long path lengths can be achieved compactly. Another advantage of this geometry is that only tiny gas volumes are required. Three meters of this holey fibre filled using only 30 nL of gas would be required. However, it is noted that if the pitch is made too small it becomes difficult to fill the holes with gas in a reasonable time.

Since fibre losses can be low, one could envisage holey fibres with extremely long equivalent free-space path lengths. Also, the combination of the confinement provided by the fibre and the endless single-moded operation which is possible in holey fibre ensures good model overlap between very different wavelengths over long distances. This is advantageous for sensing, because the absorption signatures of different pollutants can be at quite disparate wavelengths. Hence, holey fibres have the potential to provide an ideal environment for evanescent field devices. Further optimisation of the holey fibre geometry is likely to significantly enhance this potential.

Another type of air-clad fibre was proposed by the article Kaiser et al [6], the full contents of which is incorporated herein by reference. In the Kaiser structure, the core is supported by a thin spoke-like membrane. Such a structure can be single mode. This fibre is closely related to the suspended rod model described above. However, Kaiser et al considered only structures where the membrane thickness 't' is much greater than the wavelength, for which most of the light is located in the glass. By reducing the scale of this structure, which is analogous to reducing the pitch in a holey fibre, the overlap of the mode with the air could be increased. This alternative single-material fibre design could also be used to create compact evanescent field devices. The right is reserved to specifically claim such structures in the present application, or in divisional, continuation or continuation-in-part applications herefrom.

In summary, the overlap of the fundamental optical mode with the air holes in a holey fibre has been studied for what is believed to be the first time. This has been done using a newly developed vector model. It has been shown that a significant fraction of the modal power can be made to overlap with the holes by careful choice of the structural feature sizes using only average refractive index effects, i.e. without resorting to photonic band gap effects.

Furthermore, it has been shown that the structural feature sizes of typical prior art holey fibres based on average refractive index effects have utterly failed to provide any significant mode power in the holes, so that such prior art holey fibres could never have provided efficient evanescent field devices. Most if not all of this type of prior art holey fibres were thus unsuited for evanescent field device applications without this being realised.

The results presented show that holey fibres and analogous structures may indeed become useful for future commercial evanescent field devices. Specifically, the proposed holey fibres should be tolerant to variations in the pitch across the fibre. By contrast, for holey fibre based on guidance by photonic band gap effects, stringent adherence to a constant pitch is required. Thus, although the proposed holey fibre may have a generally periodic hole structure (if only as an artefact of the fabrication process), this is not relied upon for the basic functioning of the device and could be dispensed with. The definitions of the proposed holey fibre in terms of its pitch and hole size in the above and in the following claims are thus to be construed as meaning an overall pitch and hole size, possibly with a large variance across the fibre.

REFERENCES

1. T A Birks et al: Electronic Letters, vol. 31, pages 1941–1943 (1995)
2. U.S. Pat. No. 5,802,236: DiGiovanni et al: Lucent Technologies Inc.
3. P J Bennett et al: Optics Letters, vol. 24, pages 1203–1205 (1999)
4. P J Bennett et al: CLEO '99, CWF64, page 293
5. Rosenborg et al: Optics Letters, vol. 21, pages 830–832 (1996).
6. Kaiser & Astle: The Bell System Technical Journal, vol. 53, pages 1021–1039 (1974)
7. T A Birks et al: OFC '99, paper FG2, (1999)
8. T M Monro et al: J Lightwave Technology, vol. 17, pages 1093–1102 (1999)
9. T M Monro et al: J Lightwave Technology, vol. 18, pages 50–56 (2000)
10. W Demtroeder: "Laser Spectroscopy" Springer (1996) Section 15.2.1
11. A Snyder & J Love: "Optical Waveguide Theory" Chapman & Hall (1995) Chapter 14
12. K Ikuta, Y Oki & N J Vasa: CLEO '98, CTHQ4, 1998
13. U.S. Pat. No. 5,155,792: Vali & Chang: Hughes Aircraft Company
14. R F Cregan et al: Science, vol. 285, pages 1537–1539 (1999)

What is claimed is:

1. An optical fiber having a core and a cladding, the cladding containing holes defined by cavities that run lengthwise down the optical fiber and that are distributed across the optical fiber adjacent to the core to define a pitch, wherein the pitch is between 0.1 and 0.9 microns, wherein the holes have a characteristic hole size and the ratio of hole size to pitch is greater than or equal to approximately 0.6.

2. An optical fiber according to claim 1, wherein the pitch is between 0.5 and 0.9 microns.

3. An optical fiber according to claim 1, wherein the ratio of hole size to pitch is between approximately 0.6 and 0.8.

4. An optical fiber according to claim 1, wherein the pitch is equal to or less than approximately one of 0.75, 0.7 and 0.6 microns.

5. An optical fiber according to claim 1, wherein the core contains at least one hole.

6. An optical fiber according to claim 1, wherein the core is solid.

7. An optical fiber according to claim 1, wherein the optical fiber has a principal axis of extent and the holes are elongate extending along the principal axis of extent.

8. An optical fiber according to claim 1, wherein the holes arranged so that the optical fiber guides by volume average refractive index effects.

9. An optical fiber according to claim 1, wherein the holes are arranged periodically so that guidance is obtained by photonic band gap effects.

10. A method of guiding light along an optical fiber by average refractive index effects, the optical fiber having a core and a cladding, the cladding containing holes defined by cavities that run lengthwise down the optical fiber and that are distributed across the optical fiber to define a pitch of between 0.1 and 0.9 microns, wherein the wavelength of the light is at least approximately 2.2 times the pitch of the holes, and wherein the holes have a characteristic hole size and the ratio of hole size to pitch is greater than or equal to approximately 0.6.

11. A method according to claim 10, wherein the pitch is between 0.5 and 0.9 microns.

12. A method according to claim 10, wherein the ratio of hole size to pitch is between approximately 0.6 and 0.8.

13. A method according to claim 10, wherein the pitch is equal to or less than approximately one of 0.75, 0.7 and 0.6 microns.

14. A method according to claim 10, wherein the optical fiber has a principal axis of extent and the holes are elongate extending along the principal axis of extent.

15. A method according to claim 10, wherein the holes arranged so that the optical fiber guides by volume average refractive index effects.

16. A method according to claim 10, wherein the holes are arranged periodically so that guidance is obtained by photonic band gap effects.

* * * * *